(12) United States Patent
Tucker et al.

(10) Patent No.: US 11,655,643 B1
(45) Date of Patent: May 23, 2023

(54) STRUCTURAL SOLAR ARCH

(71) Applicant: Vacuum Technologies, LLC, Sheridan, WY (US)

(72) Inventors: John F. Tucker, Sheridan, WY (US); Eldered Tom Tucker, Sheridan, WY (US); Jesse G. Ford, Sheridan, WY (US); Justin Taylor Heaps, Ranchester, WY (US); Jared Leroy Meacham, Sheridan, WY (US); Timothy Ray Koenig, Sheridan, WY (US)

(73) Assignee: Vacuum Technologies, LLC, Sheridan, WY (US)

( * ) Notice: Subject to any disclaimer, the term of this patent is extended or adjusted under 35 U.S.C. 154(b) by 85 days.

(21) Appl. No.: 17/412,780

(22) Filed: Aug. 26, 2021

Related U.S. Application Data

(60) Provisional application No. 63/070,635, filed on Aug. 26, 2020.

(51) Int. Cl.
| | |
|---|---|
| *E04H 1/12* | (2006.01) |
| *B60S 3/00* | (2006.01) |
| *H02S 20/23* | (2014.01) |
| *A47L 9/28* | (2006.01) |
| *A47L 9/14* | (2006.01) |
| *A47L 9/24* | (2006.01) |
| *A47L 7/00* | (2006.01) |

(52) U.S. Cl.
CPC .......... *E04H 1/1205* (2013.01); *A47L 7/0076* (2013.01); *A47L 9/1409* (2013.01); *A47L 9/248* (2013.01); *A47L 9/2868* (2013.01); *B60S 3/008* (2013.01); *H02S 20/23* (2014.12)

(58) Field of Classification Search
CPC ......... E04H 1/1205; E04H 6/00; H02S 20/23; A47L 7/0076; A47L 9/1409; A47L 9/248; A47L 9/2868; B60S 3/008
See application file for complete search history.

(56) References Cited

U.S. PATENT DOCUMENTS

| | | | | |
|---|---|---|---|---|
| 4,880,026 | A * | 11/1989 | Ferre | B60S 3/002 52/79.5 |
| 5,033,489 | A * | 7/1991 | Ferre | E04H 5/02 134/107 |
| 5,114,050 | A * | 5/1992 | Morris | B60S 5/02 186/36 |
| 8,375,655 | B1 * | 2/2013 | Welschholz | B60L 53/53 52/173.3 |
| 2019/0217710 | A1 * | 7/2019 | Gu | H01L 31/042 |
| 2020/0036325 | A1 * | 1/2020 | Poivet | H02S 30/20 |
| 2021/0135620 | A1 * | 5/2021 | Needham | H02S 20/23 |
| 2021/0211086 | A1 * | 7/2021 | Schwarze | E04F 10/005 |

* cited by examiner

*Primary Examiner* — Gisele D Ford
(74) *Attorney, Agent, or Firm* — Nyemaster Goode, R.C.

(57) ABSTRACT

The present disclosure includes a vacuum stall canopy assembly for a car wash system having a first post assembly having a base leg permanently attached to the ground, a beam attached to the top of the first post assembly, a roof assembly disposed on an upper portion of the beam, a debris separator disposed on the beam, the debris separator having a first side and a second side, a main airline fluidly connected to the debris separator and configured to be connected to a source of vacuum suction, a first hose on the first side of the debris separator, and having a first nozzle on a distal end of the hose from the debris separator, and a second hose on the second side of the debris separator, and having a second nozzle on a distal end of the hose from the debris separator.

20 Claims, 17 Drawing Sheets

STRUCTURAL SOLAR ARCH

CROSS-REFERENCE TO RELATED APPLICATION

This application claims priority to U.S. Provisional Patent Application No. 63/070,635, filed on Aug. 26, 2020, entitled "STRUCTURAL SOLAR ARCH," the disclosure of which is hereby incorporated herein by reference in its entirety.

BACKGROUND

Many car wash facilities include vacuum stalls for users to easily vacuum out dust, dirt, and other particles from their vehicle either before or after they use the car wash to clean the outside of their vehicle. To provide protection from the elements such as rain, snow, or excessive sunshine, many of these vacuum stalls include a roof over the stall.

SUMMARY

An aspect of the present disclosure is generally directed to a vacuum stall canopy assembly for a car wash system having a first post assembly having a base leg permanently attached to the ground, a beam attached to the top of the first post assembly, a roof assembly disposed on an upper portion of the beam, a debris separator disposed on the beam, the debris separator having a first side and a second side, a main air line fluidly connected to the debris separator and configured to be connected to a source of vacuum suction, a first hose on the first side of the debris separator, and having a first nozzle on a distal end of the hose from the debris separator, and a second hose on the second side of the debris separator, and having a second nozzle on a distal end of the hose from the debris separator.

An aspect of the present disclosure is generally directed toward a vacuum stall canopy system for covering and defining a vehicle wash bay that includes: a plurality of canopy supports each defining a side of a vehicle wash bay where the plurality of canopy supports include a first canopy support and a second canopy support and the first canopy support has a first canopy post assembly having a first canopy base leg attached to a mounting surface; and a first canopy support beam attached to the top of the first canopy post assembly at first canopy support engagement location and extending forward and backward from the first canopy support engagement location where the first canopy support base leg engages the mounting surface at a first predefined angle and the second canopy support includes a second canopy post assembly having a second canopy base leg attached to the mounting surface; and a second canopy support beam attached to the top of the first canopy post assembly at first canopy support engagement location and extending forward and backward from the first canopy support engagement location where the second canopy support base leg engages the mounting surface at a second predefined angle; a roof panel coupled to a portion of the first arch support beam and configured to span between the first arch support beam of the first arch support and the second arch support beam of the second arch support; a debris separator disposed on at least one of the plurality of arch supports, the debris separator having a first side and a second side; a main air line fluidly connected to the debris separator and configured to be connected to a source of vacuum suction; a first hose on the first side of the debris separator, and having a first nozzle on a distal end of the hose from the debris separator; and a second hose on the second side of the debris separator and having a second nozzle on a distal end of the hose from the debris separator. The first predefined angle and the second predefined angle are not 90 degrees typically.

Yet another aspect of the present disclosure is generally directed toward a structural arch system providing for a vehicle wash vacuum system that includes: a first arch assembly having a first post assembly having a base leg secured to the ground and a first beam attached to a top portion of the first post assembly; a second arch assembly having a second post assembly having a base leg secured to the ground and a second beam attached to a top portion of the second post assembly; a roof assembly spanning between the first beam and the second beam on an upper portion of each of the first and second beams; a debris separator disposed on at least one of the first and second beams, the debris separator having a first side and a second side; a main air line fluidly connected to the debris separator and configured to be connected to a source of vacuum suction; a first hose on the first side of the debris separator, and having a first nozzle on a distal end of the hose from the debris separator; and a second hose on the second side of the debris separator, and having a second nozzle on a distal end of the hose from the debris separator.

Another aspect of the present disclosure is generally directed toward a structural arch system providing for a vehicle wash vacuum system that includes: a first arch assembly having a first post attached to the ground and a first beam attached to the first post; a second arch assembly having a second post attached to the ground and a second beam attached to the second post; a roof panel spanning between the first beam and the second beam on an upper portion of each of the first and second beams; a debris separator disposed on the first beam; a main air line fluidly connected to the debris separator and configured to be connected to a source of vacuum suction; and a hose coupled to the debris separator and having a nozzle on a distal end of the hose from the debris separator.

What is disclosed is a vehicle wash canopy system having an arch support defining a side of a vehicle wash bay. The arch support includes a post assembly having a base leg attached to the ground and a beam attached to the top of the post assembly. The system has a roof panel on an upper portion of the beam that spans between the beam and a second beam on a second arch support on a second side of the vehicle wash bay, a debris separator having a first side and a second side on the arch support, a main air line connecting the debris separator a source of vacuum suction, a first hose on the first side of the debris separator, and a second hose on the second side of the debris separator having nozzles on opposite ends of the hoses from the debris separator.

These and other aspects, objects, and features of the present invention will be understood and appreciated by those skilled in the art upon studying the following specification, claims, and appended drawings.

DETAILED DESCRIPTION

As used in the disclosure, the front of the vacuum stall is referred to as the end of the stall into which the vehicle (car, truck, sport utility vehicle, semi-tractor and the like) enters, and the rear of the vacuum stall is the end of the stall with the optional riser and the typically where the base legs are disposed.

Typically, when a user visits a car wash, they will utilize a vacuum in order to remove dust, dirt, and other small contaminants from the inside of their car either before or after the outside is washed by the stationary, moving, standard, or touchless carwash. The vacuum systems are typically installed outside of the car wash building on the same property for easy access for the user.

Figure 1:
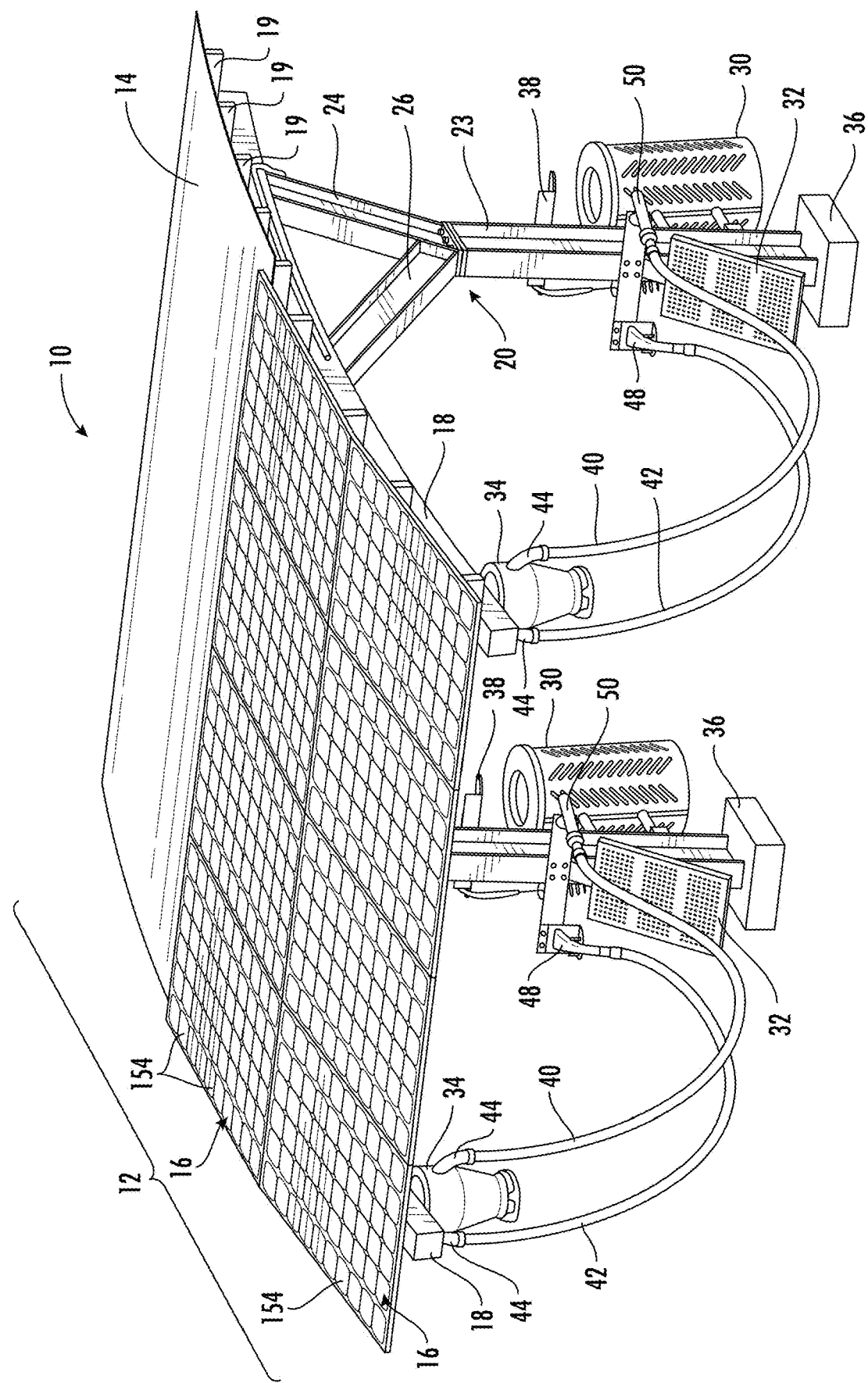
FIG. 1 is a perspective view of a stall and canopy assembly according to an aspect of the present disclosure and showing a structural solar arch.
Figure 2:
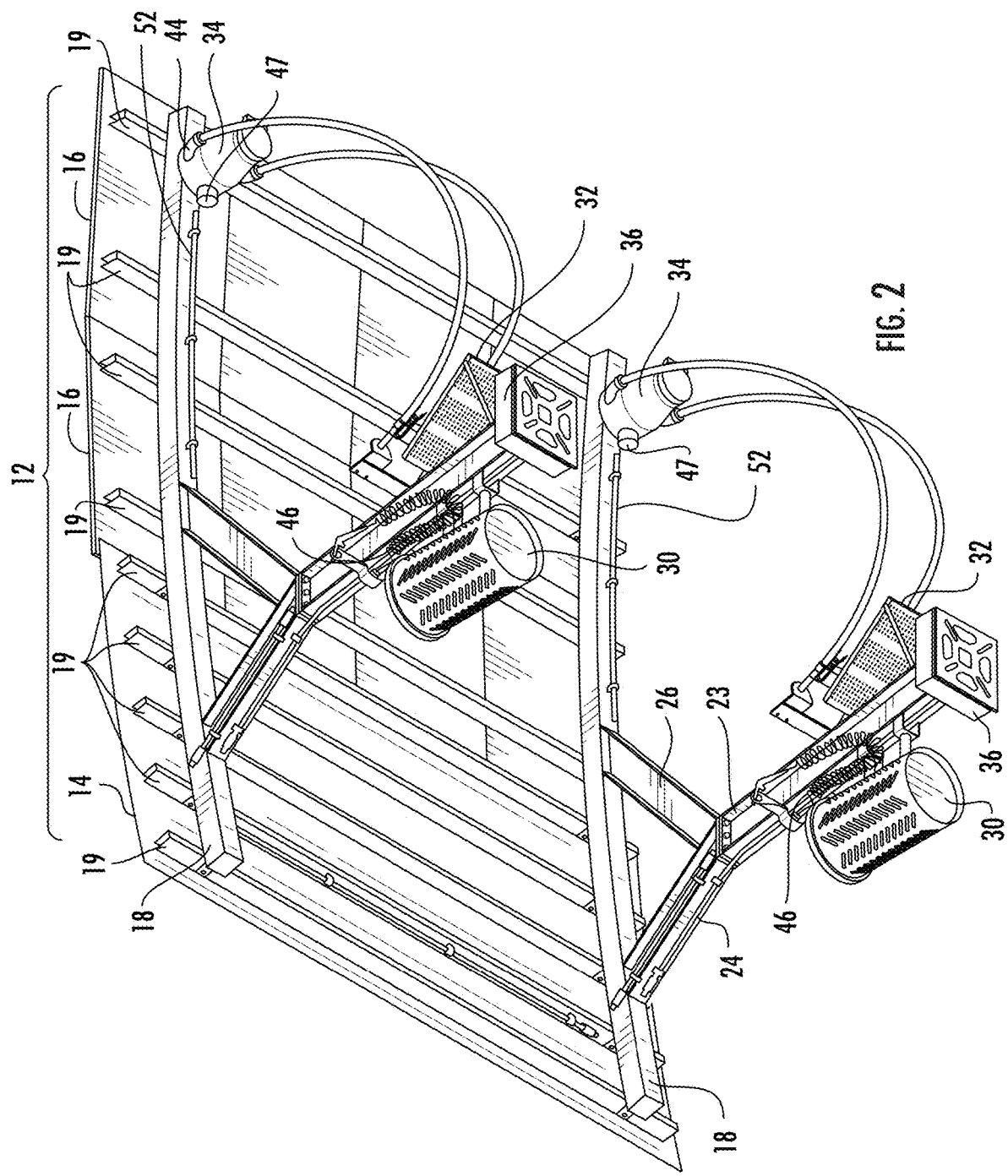
FIG. 2 is a lower perspective view of a stall and canopy assembly and structural solar arch according to an aspect of the present disclosure.
Figure 3:
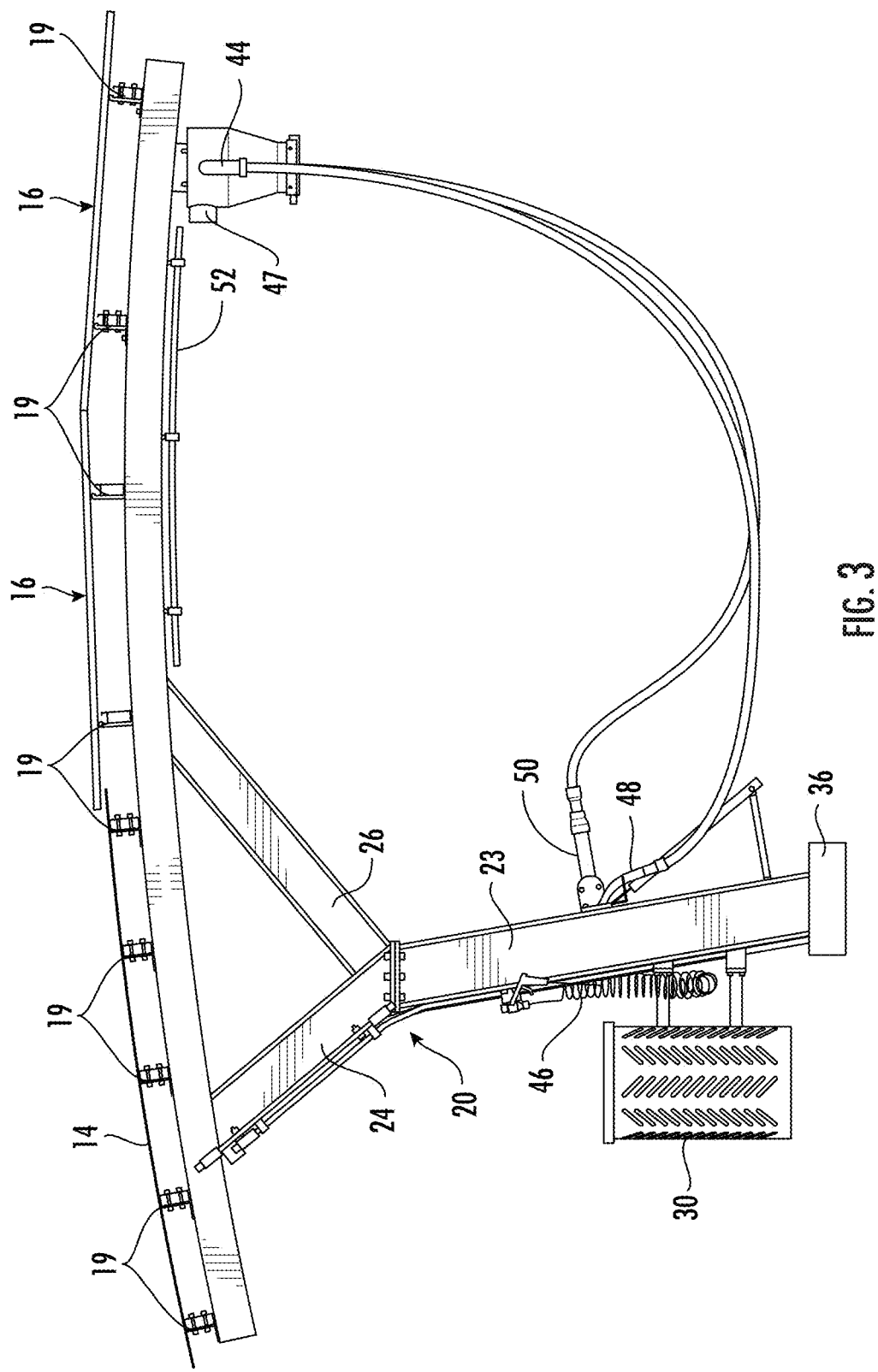
FIG. 3 is a side view of canopy assembly and structural solar arch according to an aspect of the present disclosure.
Figure 4:
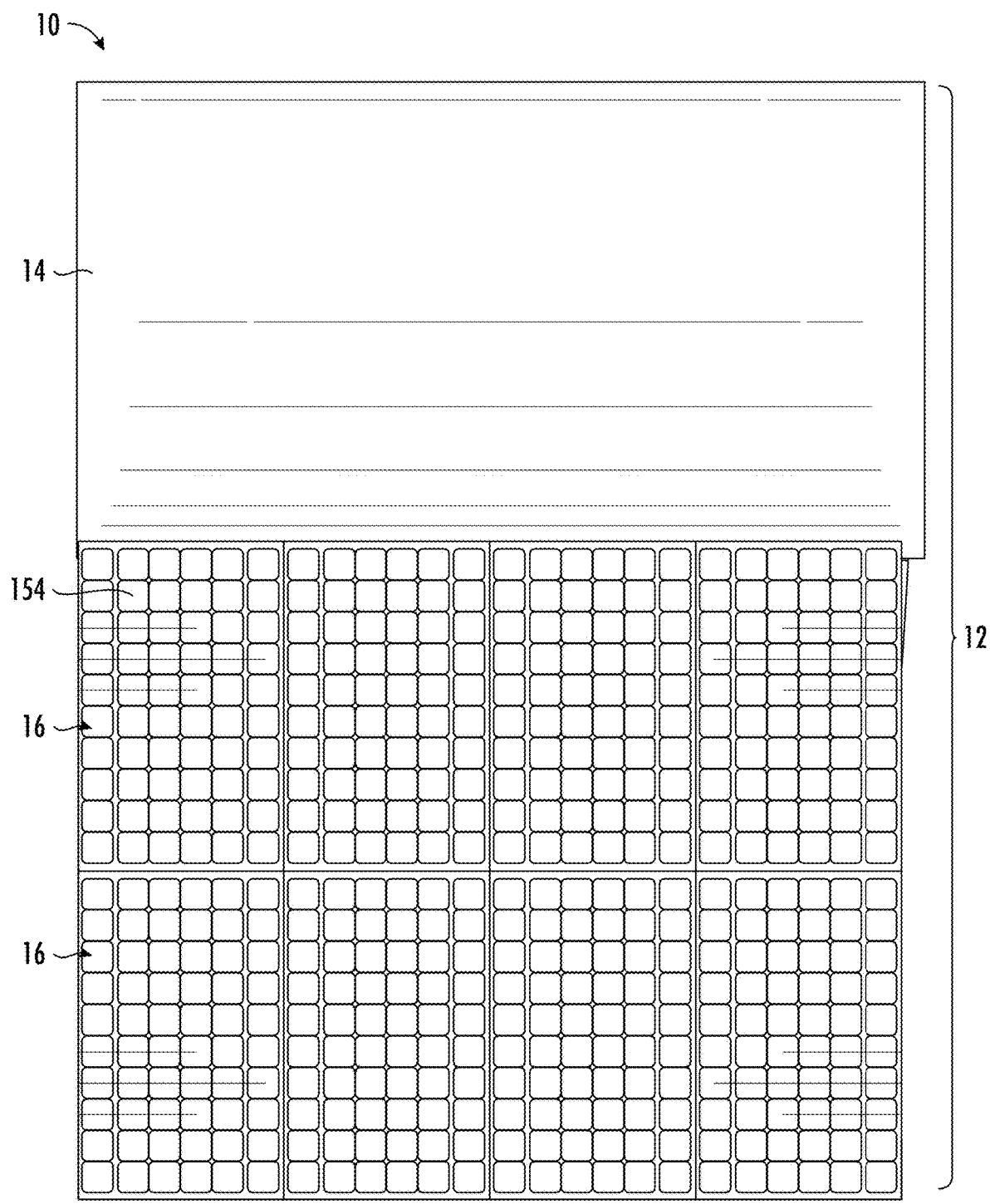
FIG. 4 is a top view of canopy assembly of the embodiment of the structural solar arch.

When a user drives into a vacuum stall they may be protected by one or more canopy 12, awning, or other roof covering structure(s). The canopy 12 may be a single element, typically a fabric covering, as shown in FIGS. 6-9, or may be comprised of a number of common or different roof elements 14, 16 that may be metal, fabric or structural supports that may optionally include solar cells on the top, solar facing surface as shown in FIGS. 1-5. The overhead elements may protect the user from precipitation such as rain or snow, or may simply provide a user shade in very hot, sunny weather. One embodiment of a vacuum system 10 is shown in FIG. 1.

The canopy 12 or awning may be supported by a beam 18. The beam 18 may be a straight beam or may be arcuate as the beam is shown in FIG. 1. The beams 18 may be cantilever beams that extend from a wall of the car wash or another structure, may cantilever out from a single post, or preferably may be supported by a separate structure such as the supporting structure 20 shown in FIG. 1. The beams 18 may be comprised of square rolled steel tubing about 4"×4" up to about 8"×8", more preferably about 6"×6". The steel is preferably about 3/16-1/4" in thickness. The beam may also be steel I-beam configuration, such as W 6"×12" I-beam, or a variable size I-beam as shown in the embodiment of FIGS. 6-10. The rolled steel tubing may provide increased strength for the structure, while simultaneously providing the operator of the property an easy way to further increase the strength of the structure by welding or otherwise attaching a side plate to the beams 18 or the individual elements of the support structure 20.

In the preferred embodiment, the beams may be supported by a support structure 20. The support structure 20 may be a single post 22 that reaches from the ground up to the beam 18 as shown in the embodiment of FIGS. 6-10, or may be a Y-structure base assembly comprising a base leg 23 and supporting legs 24, 26, as shown in the embodiment of FIGS. 1-5. The support structure 20 may locate the beams 18 up to between 9'-10' in height and allow the beams to extend out about 12'-18' in order to cover substantially all of the vehicles that are in the stall for cleaning. The support structure 20 may include a base leg 22 that is permanently or semi-permanently attached to a footer 36, 136 on or within the ground or other mounting surface such as cement. The footer 36 may be a concrete footer that is attached to the ground by ground stakes or in any other way known in the art. The base leg 22 may be attached to the footer by bolts, or the leg may be placed within the footer while the concrete is still wet such that the footer sets around the base leg and holds it in place once it cures.

In the arch embodiment, the base leg 22 may reach up to about 6 feet, but also may reach higher or lower depending on structural needs. There may be at least two stabilizing legs 24, 26 that attach to the base leg 22 at the top of the base leg 22. The stabilizing legs 24, 26 may be attached to the base leg by lag bolts, welding, or any other attachment known in the art. The stabilizing legs 24, 26 may extend upwardly from the base leg 22 to a height of 8-12 feet or more above the ground depending on the requirements of the vacuum stall. The base legs 22, stabilizing legs 24, 26, and beams 18 may all be finished by a powder coated process to ensure maximum weatherability and offer up many different colors based on individual preferences.

There may also be lighting such as light emitting diode (LED) 52 lighting disposed on the bottom side of the beams 18 to offer better and more efficient lighting for a user to see the debris within their vehicle when ambient lighting may not be sufficient. With the beam 18 in the arch or arcuate configuration, the beam 18 may provide more structural strength than a straight beam, which may be important if the car wash operator chooses to support more elements from the beams than the simple roof or canopy elements shown or if it is located in a location where much snow is expected. A mat rack 32, air hose bracket 38, 138 and a trash can 30, 130 are attached to the base legs 22, 122 through brackets that are bolted to the base legs through drilled holes in the base leg, which allows a user to easily clean up large debris and move the car mats within the vehicle out of the vehicle without placing them on the ground which may be very dirty as well. The system may also include a compressed air delivery hose 46, 146 operably connected with a compressed air source to provide compressed air for use in cleaning interior vehicle surfaces and/or delivery of compressed air for inflation of tires.

In the arch embodiment shown in FIGS. 1-5, a debris separator 34 may be attached to the bottom side of the beams 18 near the rear of the vacuum stall. Rear as shown in the embodiment is toward the rear of the vehicle as it drives straight into the stall. The debris separator 34 is connected to an industrial vacuum pump (not shown) that may be remotely located from the vacuum stall. The industrial vacuum pump may be located in a utility room within the car wash facility or in any other located convenient for the operator of the car wash. The debris separator 34 is connected to the industrial vacuum pump through piping that is disposed along the beams, and removes any debris from the air stream that is sucked up by the user utilizing the vacuum nozzles 48, 50, 148, 150 before it can get back to the industrial vacuum pump. The location of the debris separators 34 make it easy for an operator of the car wash to empty the debris by simply reaching up and removing a bottom side dump valve and removing the debris from the separator 34. The debris separators each typically have a vacuum air intake 47, which does not have a main hose line shown in the drawings, but that would typically engage either a vacuum air supply unit located and associated with each individual vehicle bay or each interconnected with a remotely located vacuum air supply system for all or a plurality of the vehicle vacuum stall canopy system stalls. The debris separator 134 may also be located at the front of the stall, as shown in the embodiment of FIGS. 6-10.

The debris separators 34 may have a pair of hoses 40, 42 fluidly attached. Including hoses on either side of the debris separator 34 allows users on either side of adjacent stalls to use one of the hoses extending from one of the debris separators to vacuum up dirt, dust, and other small debris that builds up within and on either side of a vehicle. In the embodiment shown in FIGS. 6-10, the debris separator 134 is disposed on the beam at the front of the stall to allow operators access to the separators from the front of the stall.

In use, the industrial vacuum pump creates suction that at the debris separator 34 and 134. The suction from the debris separator is available to a user at the vacuum nozzles 48, 50 or 148, 150. The vacuum nozzles 48 and 50 (and 148 and 150) may be the same type of nozzle, or as shown may have different configurations. As the user vacuums, the picked-up dirt, dust, and other particles are pulled through the hoses 40, 42, 140, 142 and are held within the debris separator. The hoses typically connect to the separator using connectors 44 that may have threaded connections or a snap fit connection to a hose. The connections are typically at least substantially air tight or air tight to limit loss of vacuum power supplied from the remotely located vacuum unit that provides vacuum air to multiple vehicle vacuuming bays or a vacuum unit associated with an individual vehicle vacuuming bay. In this way, the dust, dirt, and other particles do not travel all the way back to the industrial pump in order to keep it running well. The hoses 140, 142 may connect with a debris separator 134 at the rear of the system as shown in FIGS. 6-10 via interconnecting hoses 156 that typically extend from front to back along the top of the beams 118.

The canopy or roof of the vacuum stall may comprise simple flat or corrugated roof panels 14, solar panels 16, canopy 112 (typically a fabric canopy), fabric awning, or any combination thereof. Typically, these are uniformly used, e.g. all solar panels, all corrugated, or all fabric awnings, but it is within the scope of the disclosure to mix and match different canopy structures within a single canopy. In the embodiment shown in FIGS. 1-5, there are two solar panels 16 and a simple flat panel 14, however, the panels can be placed and installed in any order and in any fashion. For instance, in the arch embodiment there are three panels shown, however there may be a single panel, or more than three panels used. The panels may be attached to the beams 18 through joists 19 or stringers. The joists 19 are preferably a metal joist such as steel joists.

In the arch embodiment shown in FIGS. 1-5, there are typically two composite solar panels 16 in the roof canopy assembly 12 made up of a plurality of individual solar cells 154. In other embodiments, one solar panel 16 may be used, or more preferably, three or more solar panels 16 may be used. The solar panels 16 are used to turn sunlight into electricity in a manner known in the art and deliver power to the overall systems of the present disclosure or back to the mains electrical grid if excess electricity is generated. The solar panels may be used to power the electrical uses of the stall as a stand-alone feature, or they may be tied into the mains electrical grid by power cables run between the solar panels, the electrical components in the vacuum stall, and the local mains power supply. For a facility with many stalls, this may be a much more efficient, cleaner, and inexpensive use of electrical energy.

In another embodiment, as shown in FIGS. 6-10, the canopy 112 is a fabric canopy that typically does not employ solar cells, but conceivably could include them. The fabric canopy may be stretched between the beams 118. The canopy 112 may be held in place by a quick release strap system 117. The quick release system may include a nylon strap 113 that is sewn or otherwise permanently attached to the canopy 112. The strap 113 is fed through a quick release mechanism 114, which allows for easy tightening and releasing of tension on the strap 113 and by extension the canopy 112. The quick release mechanism may include a ratcheting device that allows a user to easily attach the strap 113 without the full tension of the canopy on the strap 113.

The other end of the strap 113 is permanently attached to a bracket 115, which may be bolted to the beam 118 using a nut or head of a bolt 116. In this way, the canopy 112 may be attached to one beam 118 on one side of the stall and then attached to another beam 118 on the other side of the stall easily without the fully installed tension of the canopy on the strap 113. The strap 113 may then tightened by the ratcheting device in the mechanism 114 to provide the necessary structural hold for the canopy. This type of connection to the beams 118 additionally provides for an amount of tolerance in the canopy 112 itself in that the fabric need not be cut and sewn perfectly to size. Longitudinal support of the canopy 112 may be provided by rods or bars 119 that are placed within sewn pockets on either side of the canopy 112. In another embodiment, the strap is permanently or semi-permanently attached to the bar 119 as opposed to being sewn to the canopy 112 itself.

In this embodiment, the beams 118 are held up by posts 122, and the debris separators are mounted to the front of the stall. Similar to the arch embodiment, LED lights 152 may be mounted on the underside of the beams 118. Like the arch embodiment, this embodiment may include a garbage or trash can 130. In this embodiment, the garbage can 130 may have a weighted lid 130a that rests on the top of the garbage can 130. The added weight assists the lid 130a in high wind or other situations to keep the lid 130a on the top of the garbage can 130. The garbage can 130 may be located directly below the debris separator 134 and include an inner liner 130b. The inner liner 130b may be rigid to ensure that the inner liner may be removed easily from the garbage can 130. The inner liner may have a plastic bag inserted in it for easy disposal of waste placed in the inner liner of the garbage can. The garbage can and liner are typically located directly below the debris separator 134 in this embodiment, which allows a user or a facility maintenance person to easily dump debris from the inside of debris separator 134 through the bottom door 134a of the debris separator 134 and into the garbage can 130, or directly into the inner liner 130b if the user removes the lid and lifts the inner liner 130b up vertically closer to the bottom door 134a. This motion is easier due to the location of the garbage can. Additionally, the bottom door 134a is typically a door that is openable using one hand and no tools so the operator can use one hand to hold the inner liner upward and the other to open the bottom door 134a of the cyclonic separator.

Figure 5:
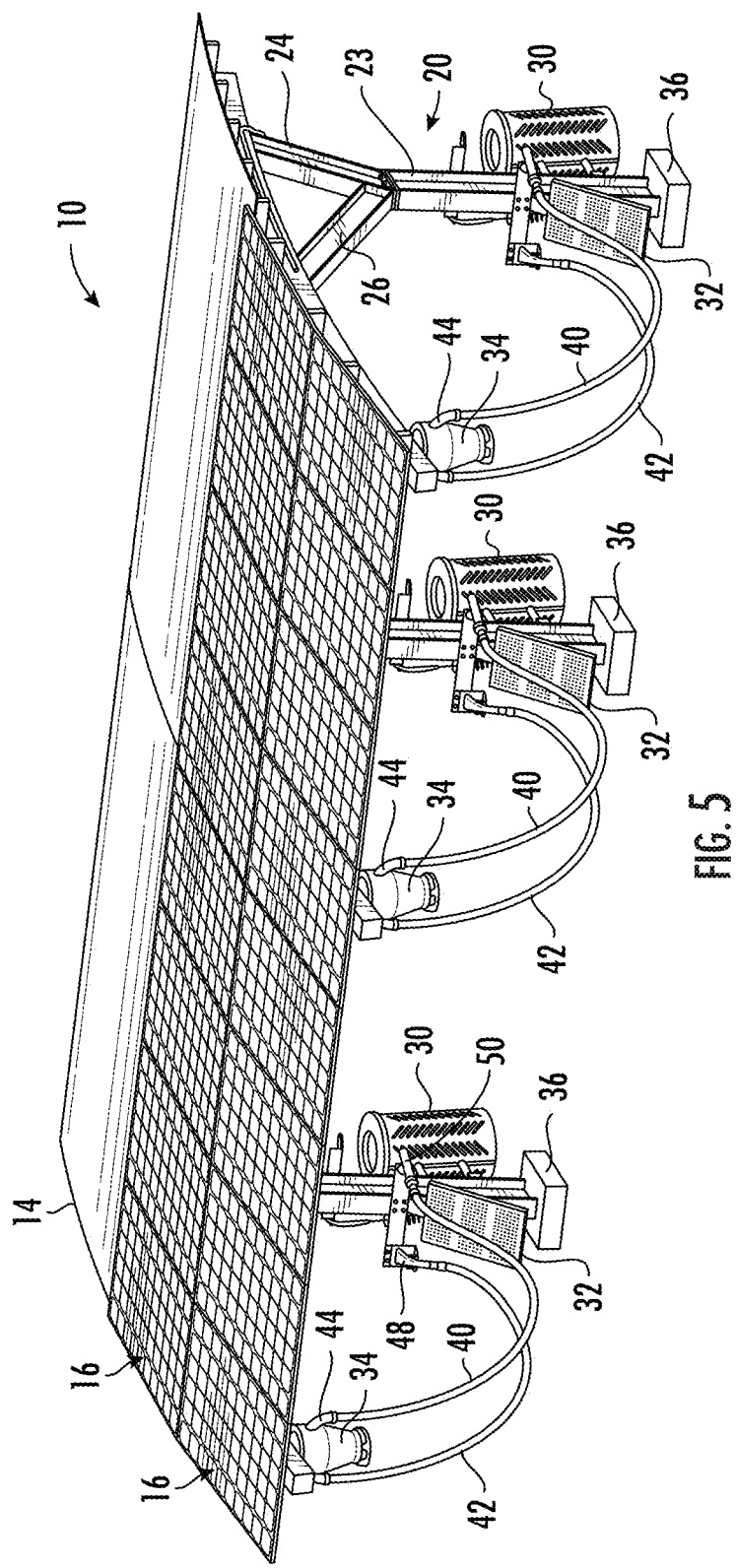
FIG. 5 is a perspective view of multiple stalls and canopy assemblies of the embodiment of the structural solar arch.
Figure 6:
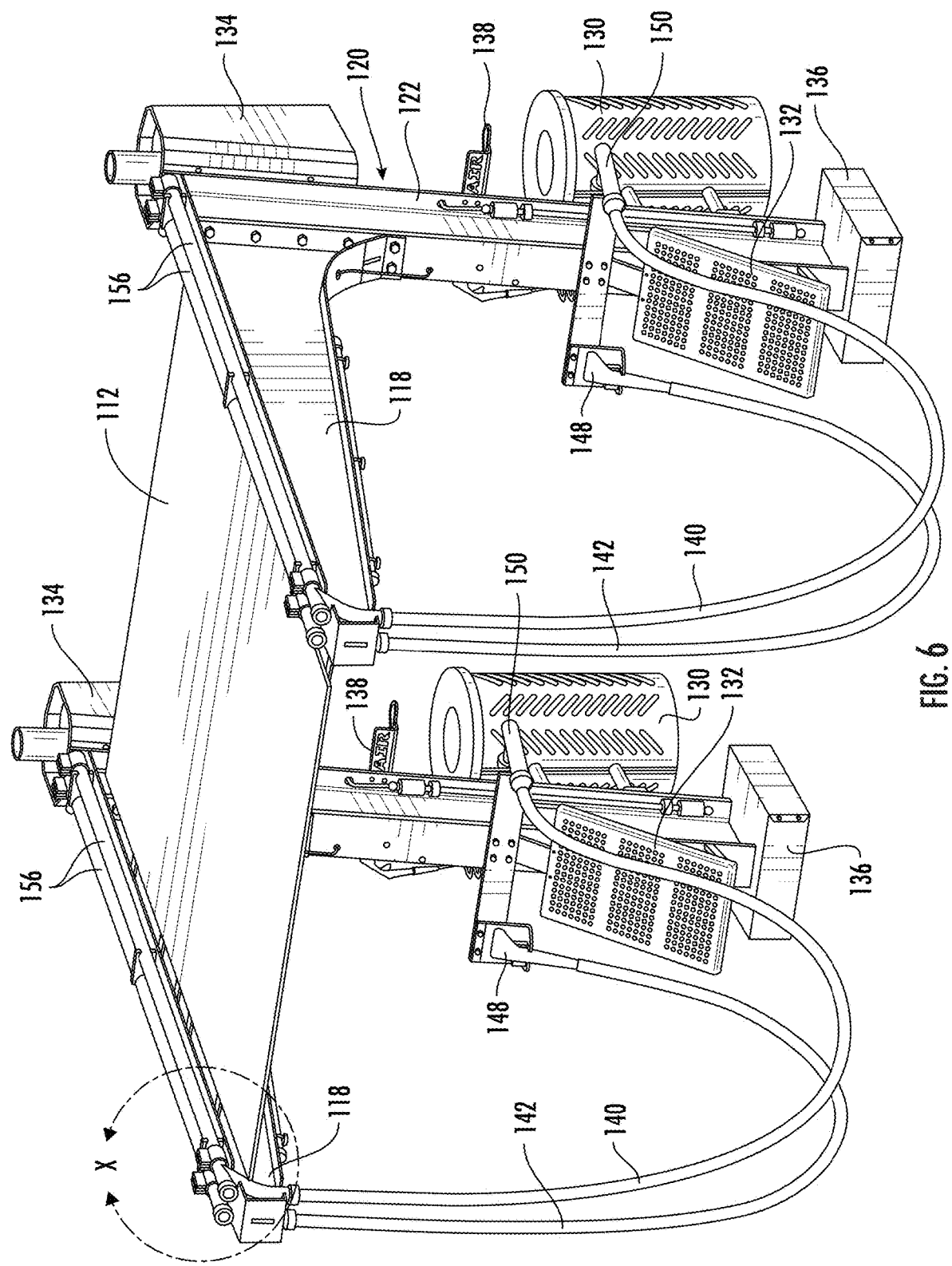
FIG. 6 is a perspective view of a stall and canopy assembly of another embodiment of the structural arch which does not typically have solar cells.
Figure 7:
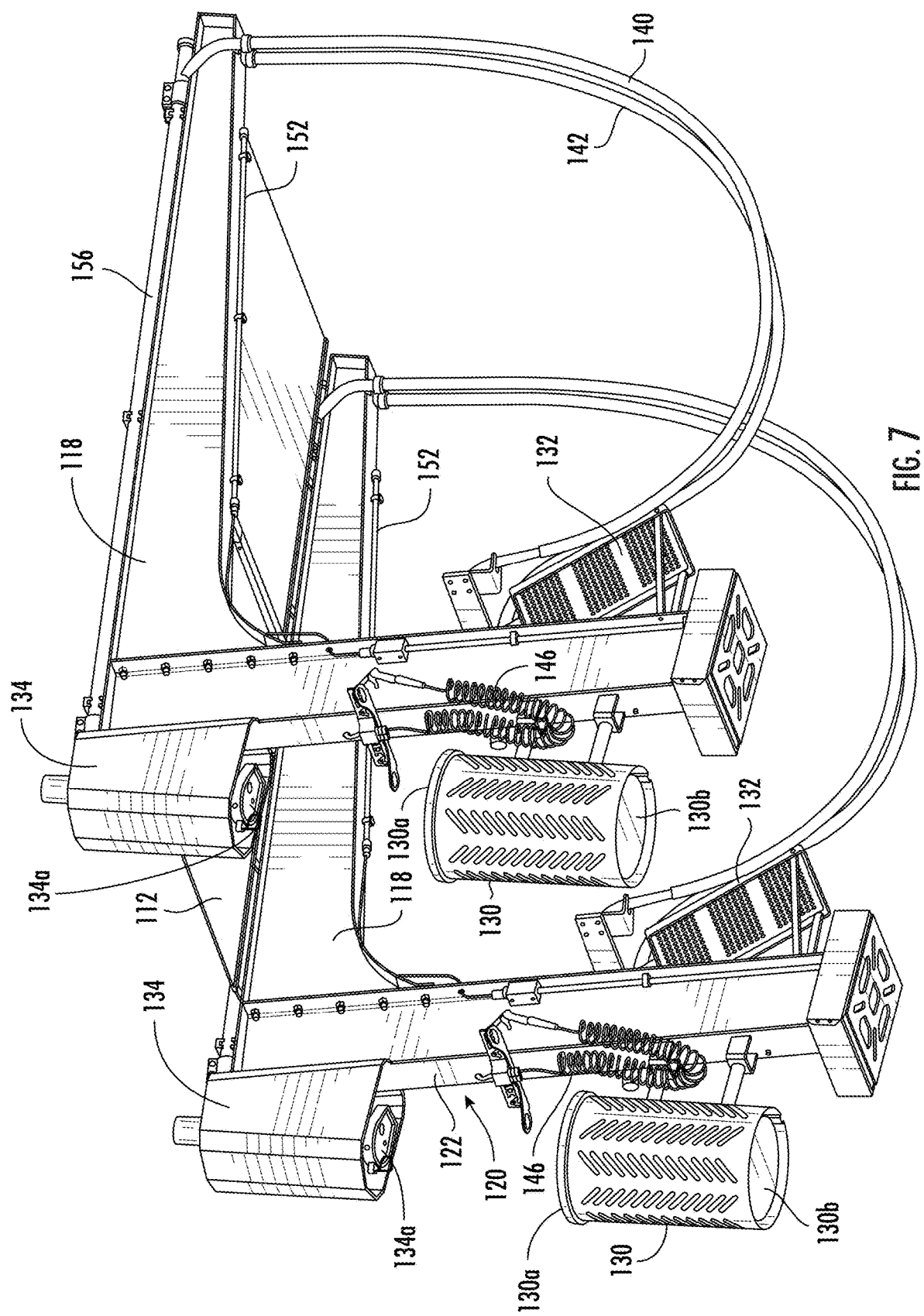
FIG. 7 is a lower perspective view of a stall and canopy assembly of the embodiment of the structural arch shown in FIG. 6.
Figure 8:
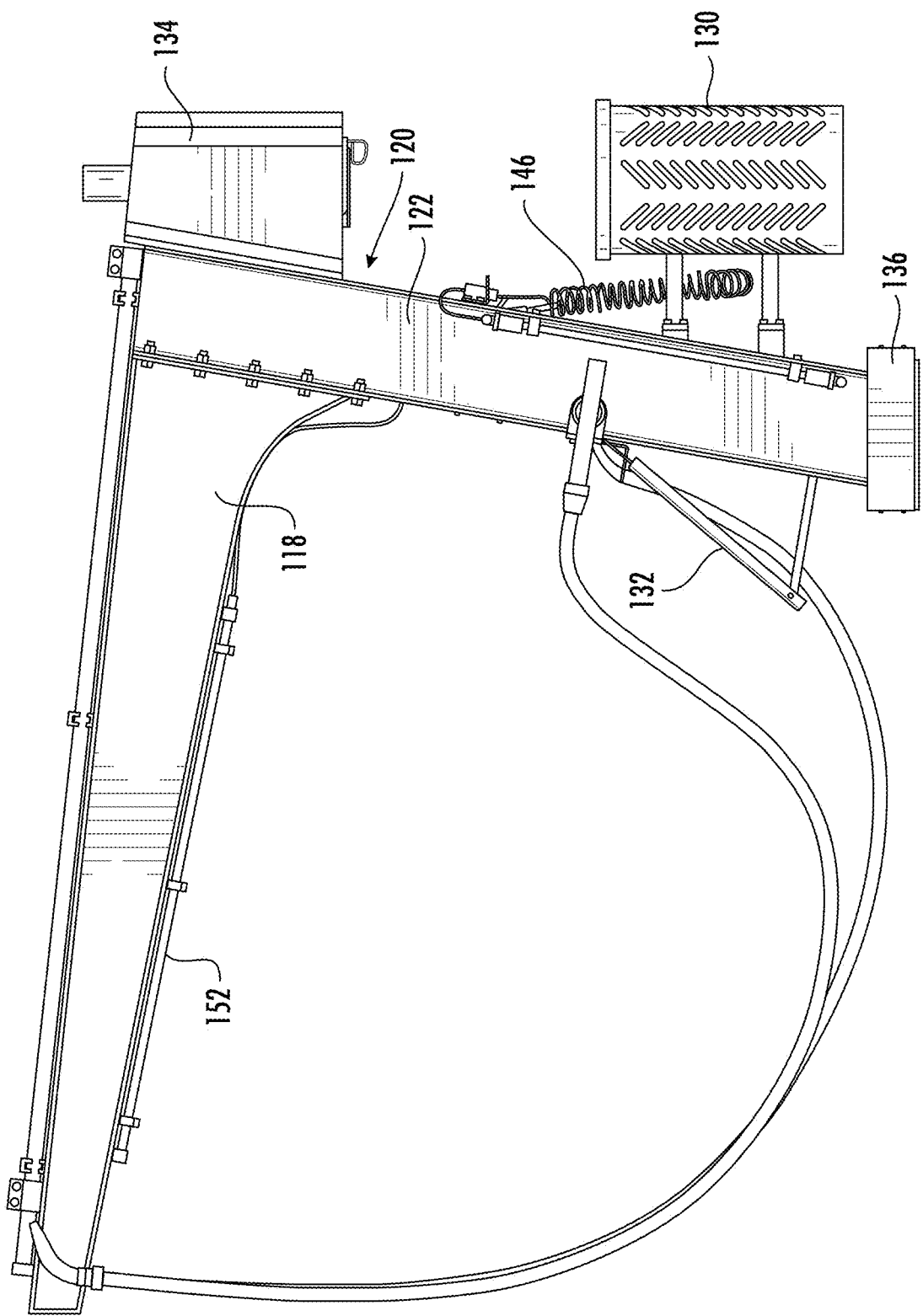
FIG. 8 is a side view of canopy assembly of the embodiment of the structural arch shown in FIG. 6.
Figure 9:
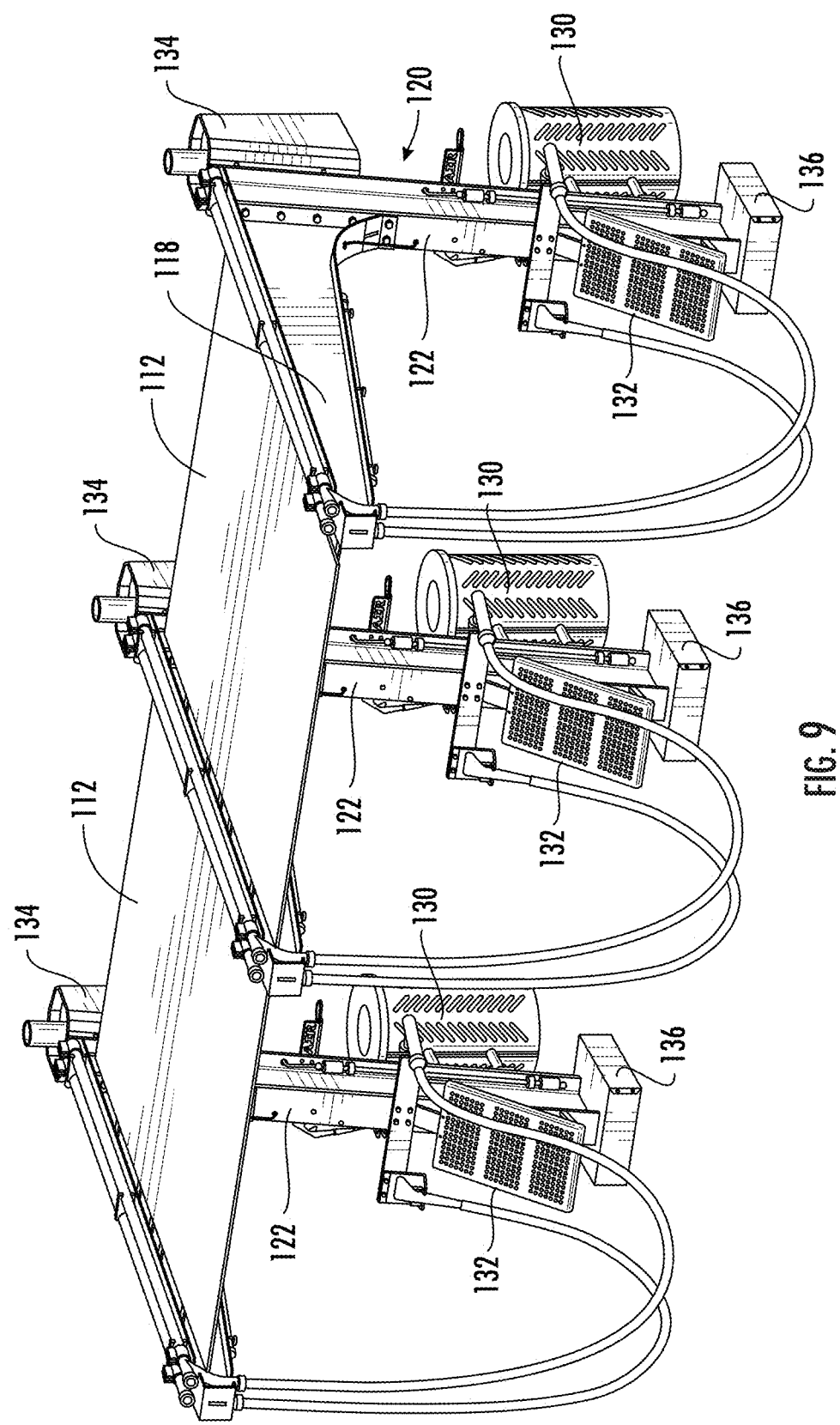
FIG. 9 is a perspective view of multiple stalls and canopy assemblies of the embodiment of the structural arch system shown in FIG. 6.
Figure 10:
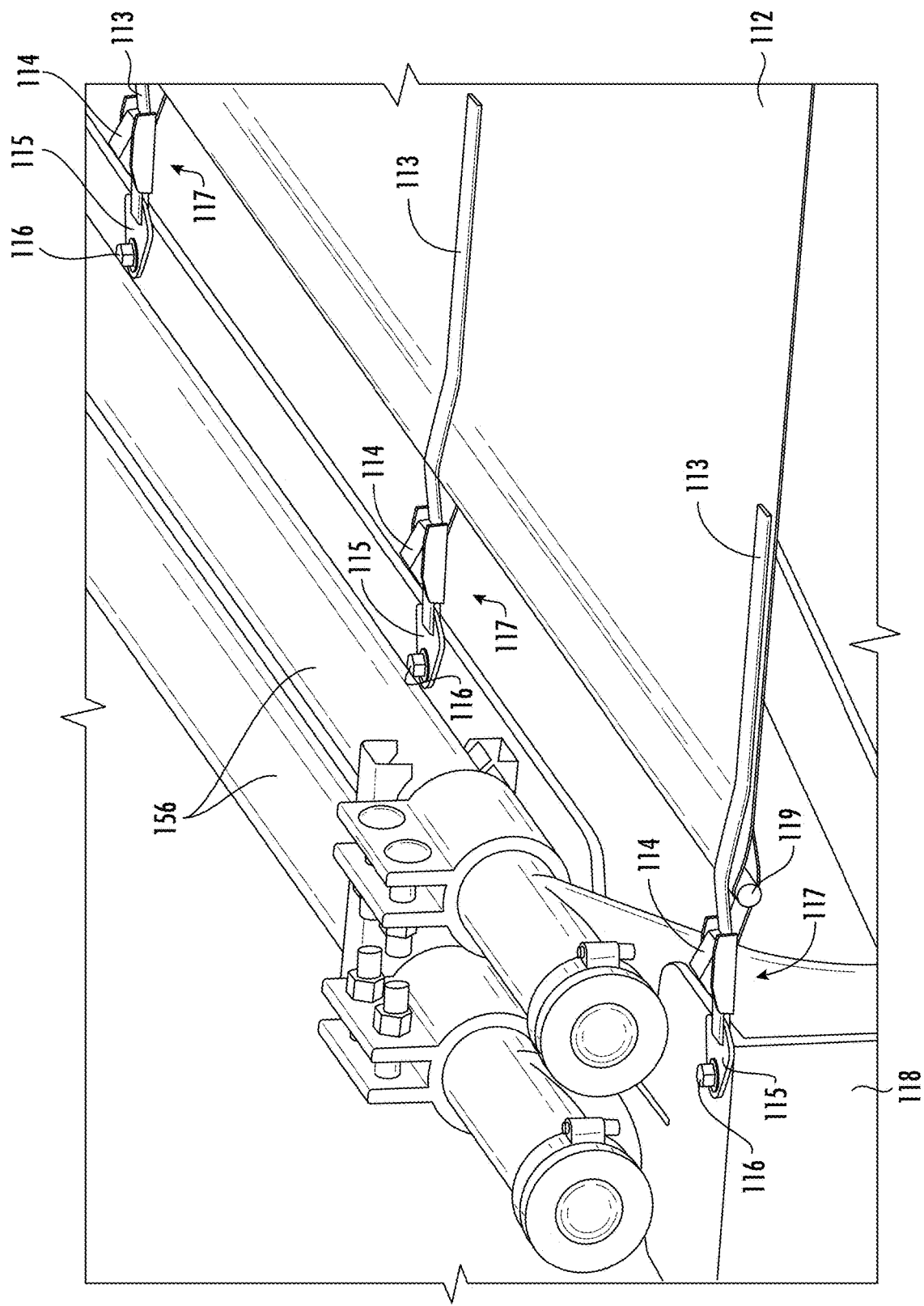
FIG. 10 is a close-up view showing a fabric canopy to beam connection of the embodiment of the structural arch shown in FIG. 6.
Figure 11:
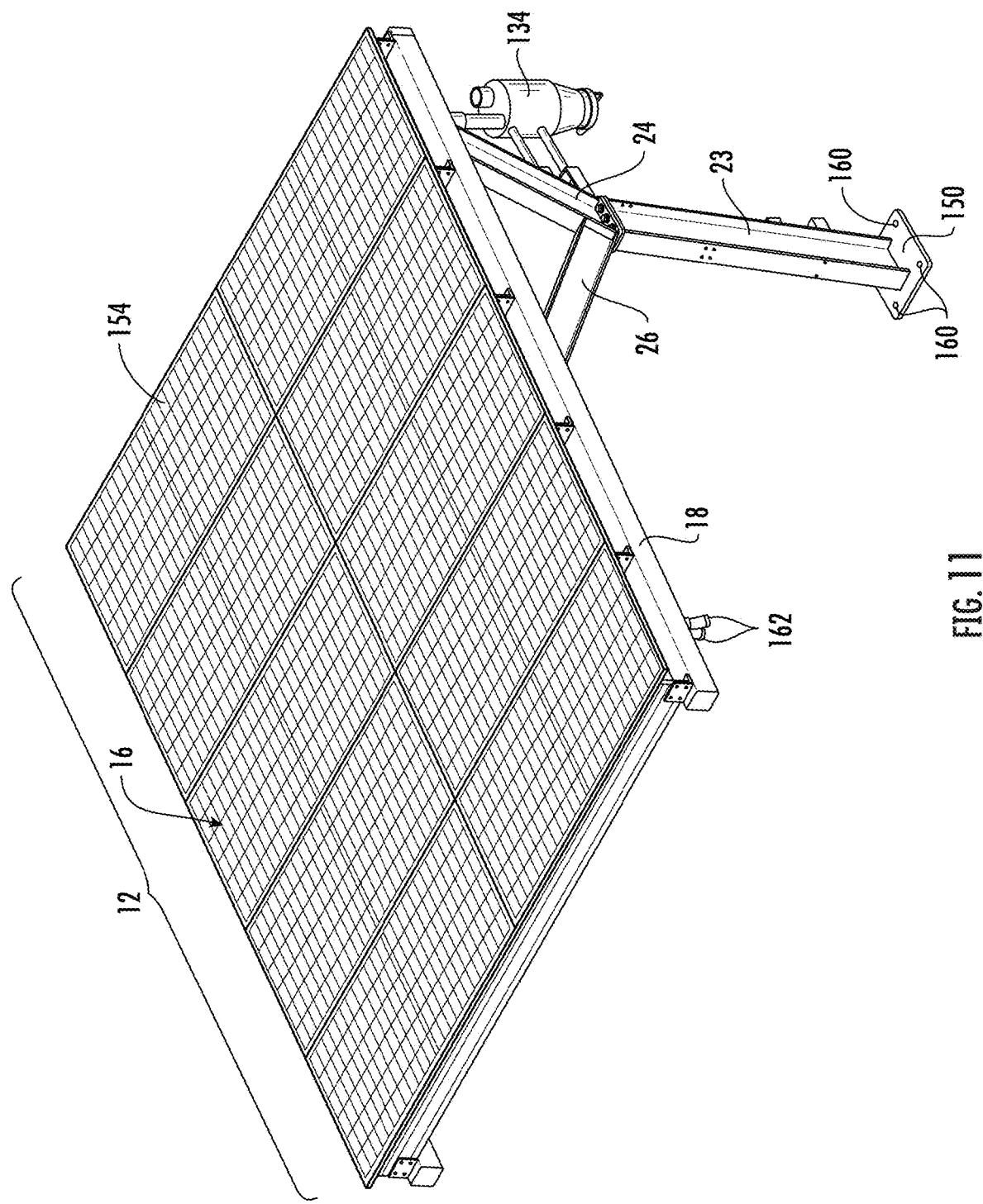
FIG. 11 is a perspective view of a vehicle stall and canopy system according to an aspect of the present disclosure.
Figure 12:
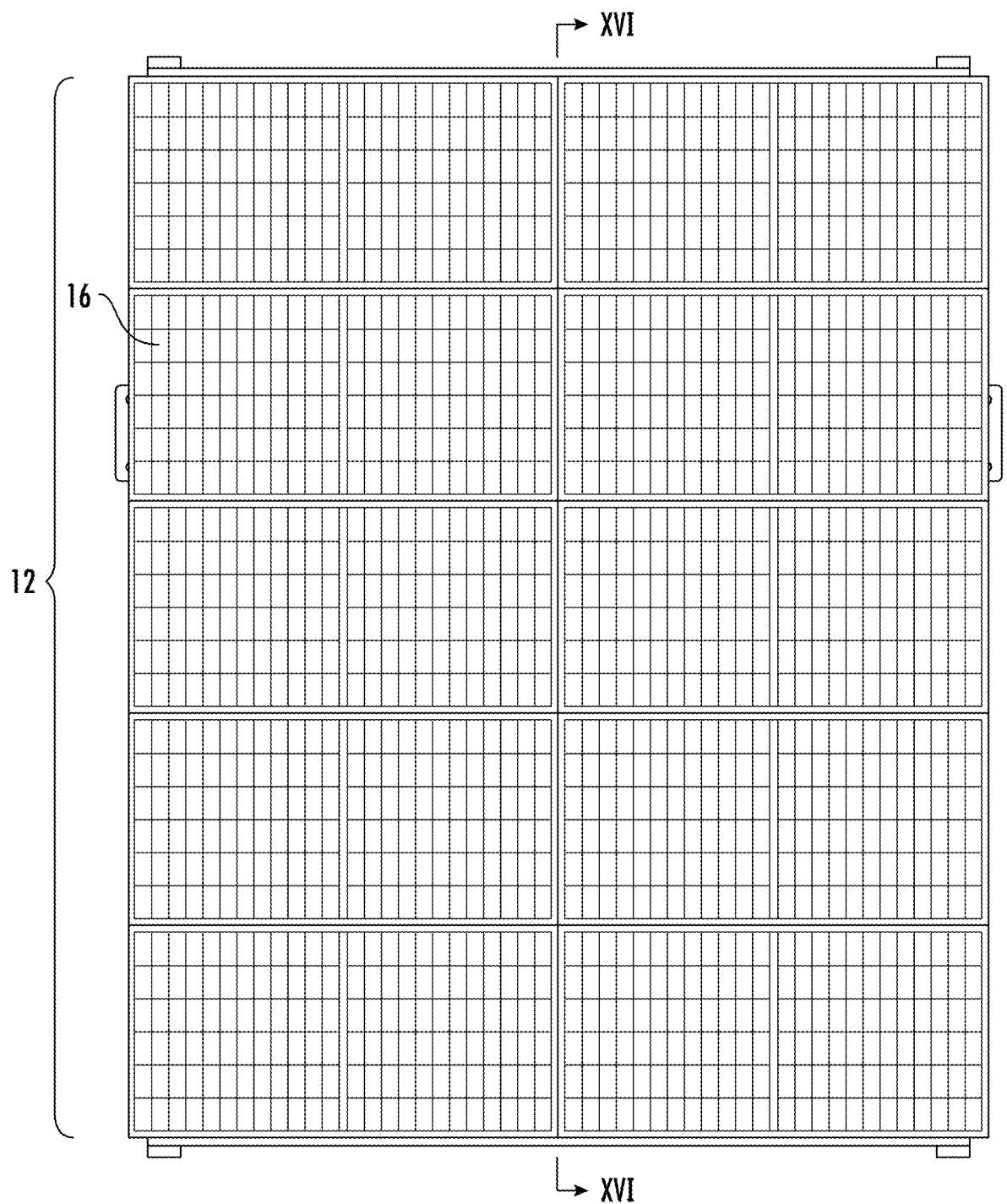
FIG. 12 is a top view of the vehicle stall and canopy system shown in FIG. 11 according to an aspect of the present disclosure.
Figure 13:
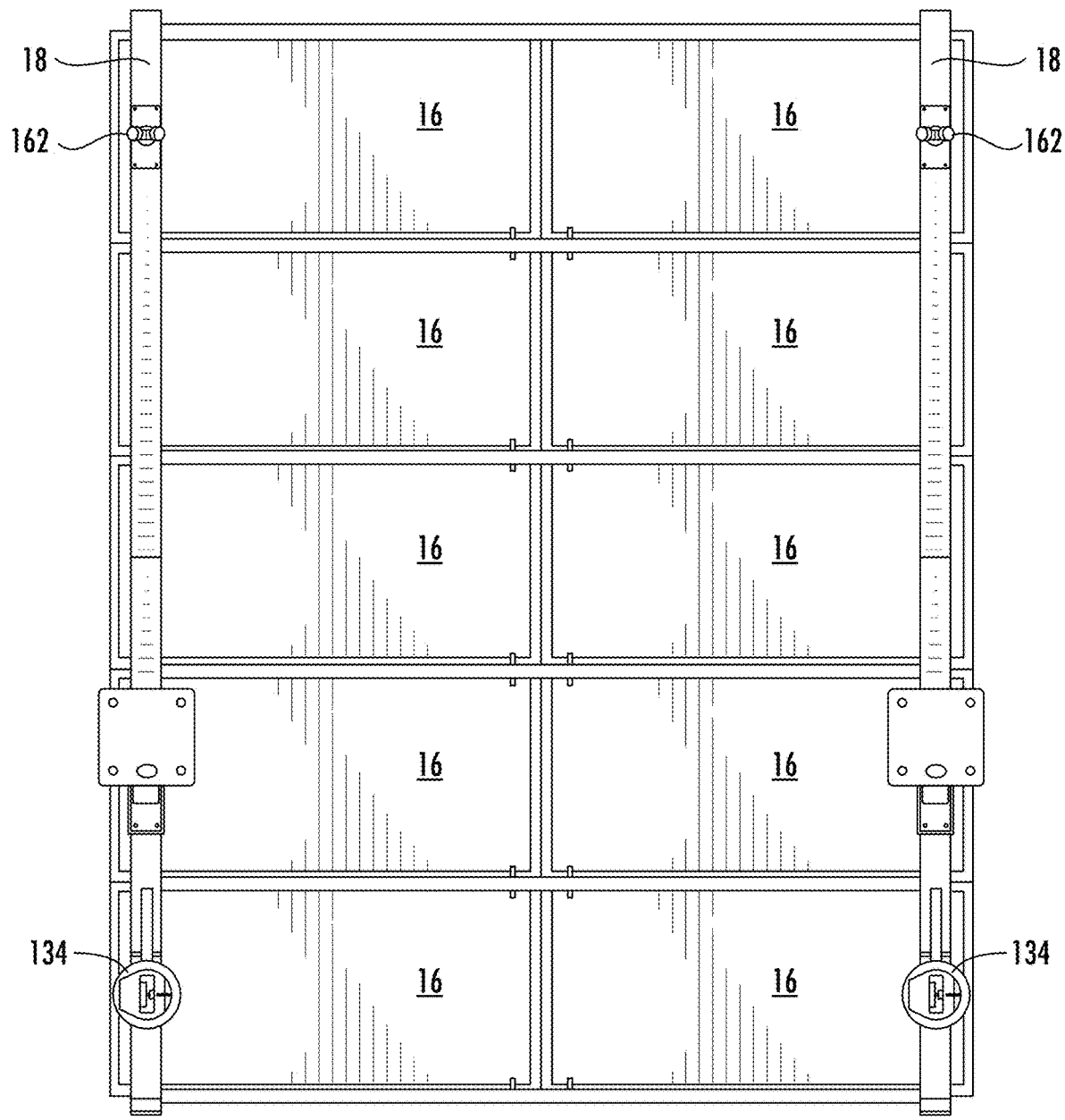
FIG. 13 is a bottom view of the vehicle stall and canopy system shown in FIG. 11 according to an aspect of the present disclosure where the system is not engaged to a mounting surface.
Figure 14:
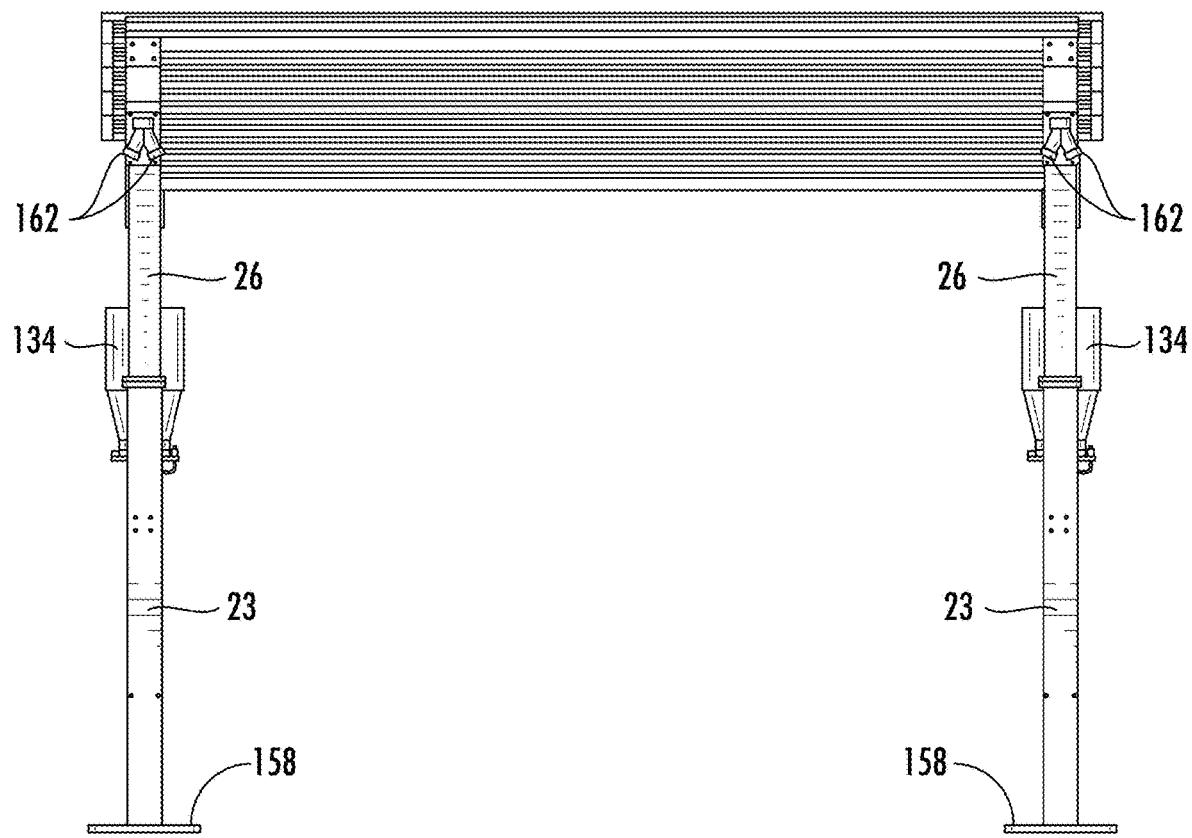
FIG. 14 is an elevated front view of the vehicle stall and canopy system shown in FIG. 11 according to an aspect of the present disclosure.
Figure 15:
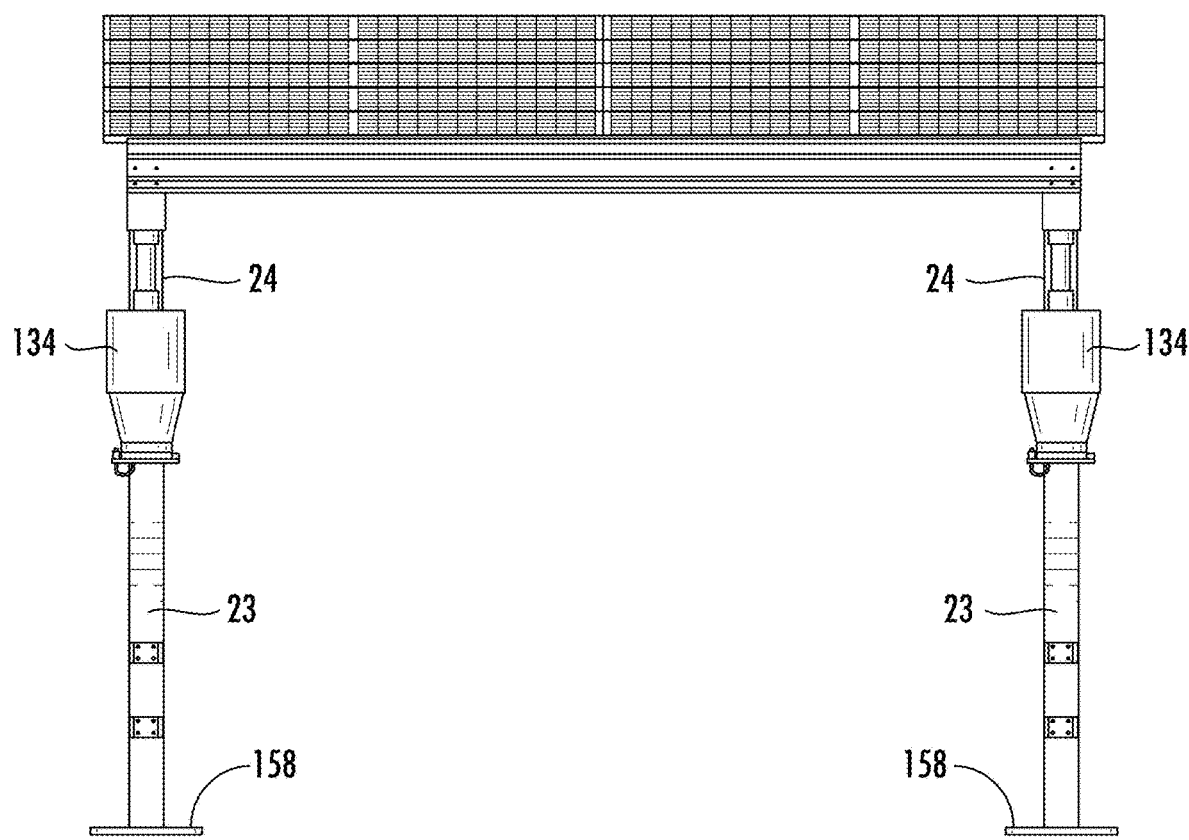
FIG. 15 is an elevated back view of the vehicle stall and canopy system shown in FIG. 11 according to an aspect of the present disclosure.

As shown in FIGS. 5 and 9, when used at a larger facility, the vacuum stalls may be used side-by-side. In this way, a single supporting structure 20 or single post assembly 120 may be used for adjoining stalls. The hoses on either side of a single debris separator 34, 134 may be used for stalls on either side of the debris separator. In this way, a facility can use the elements of the disclosure more efficiently by including more stalls in a side by side fashion. Further, if the facility area that the vacuum stalls are being used is not straight, adjoining stalls may be offset slightly at an angle to wrap around the non-linear area.

Additional aspects of the present disclosure are shown in FIGS. 11-17. FIGS. 11-17 show a vehicle vacuuming bay with a Y-shaped upward support base leg 23 and having supporting legs 24, 26 that engage and hold one side of the canopy 12. The canopy 12 shown in FIGS. 11-17 is constructed of a series of rectangularly configured solar panels with a plurality of solar cells on each panel. The panels are interconnected with one another to deliver generated power back to the overall vehicle vacuuming system and typically configured and arranged to abut one another in a water-tight configuration to prevent rain from reaching a user located under the canopy. The configuration of the canopy 12 shown in FIGS. 11-17 is a planar configuration, but could conceivably be differently shaped. The canopy, while planar, is typically positions at an upward angle from parallel to the ground or vehicle receiving surface under the canopy. Typically, the angle is not substantial, but from about 5 to about 35 degrees or any angle within this range, but the angle also could be more or less as well. Typically, the slight angle captures the sunlight and presents an inviting bay to the user while still providing coverage from sunlight when in use. The canopy may be positioned parallel to the vehicle receiving surface under the canopy as well. As shown in the figures, while a footer may be used and the base 23 cemented to the mounting surface, a base mounting bracket 158 may be used and mounting bolts or other attachment devices used to affix the base in position through the apertures 160. Each distal end of the beams 18 typically have a pair of connection nozzles 162 that operably engage the hoses to be used by the user(s) when vacuuming a vehicle.

Figure 16:
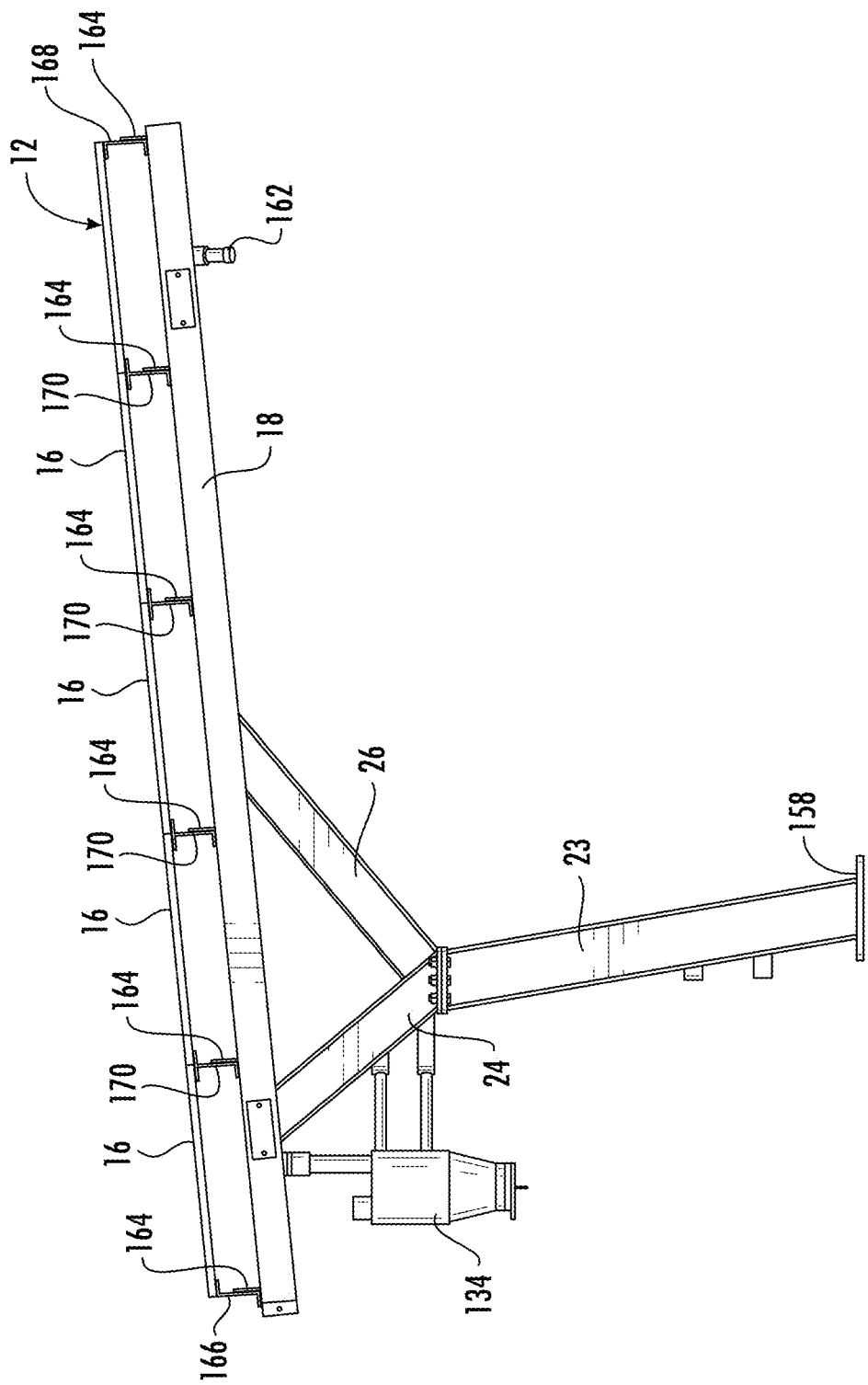
FIG. 16 is an elevated side view of the vehicle stall and canopy system shown in FIG. 11 according to an aspect of the present disclosure.
Figure 17:
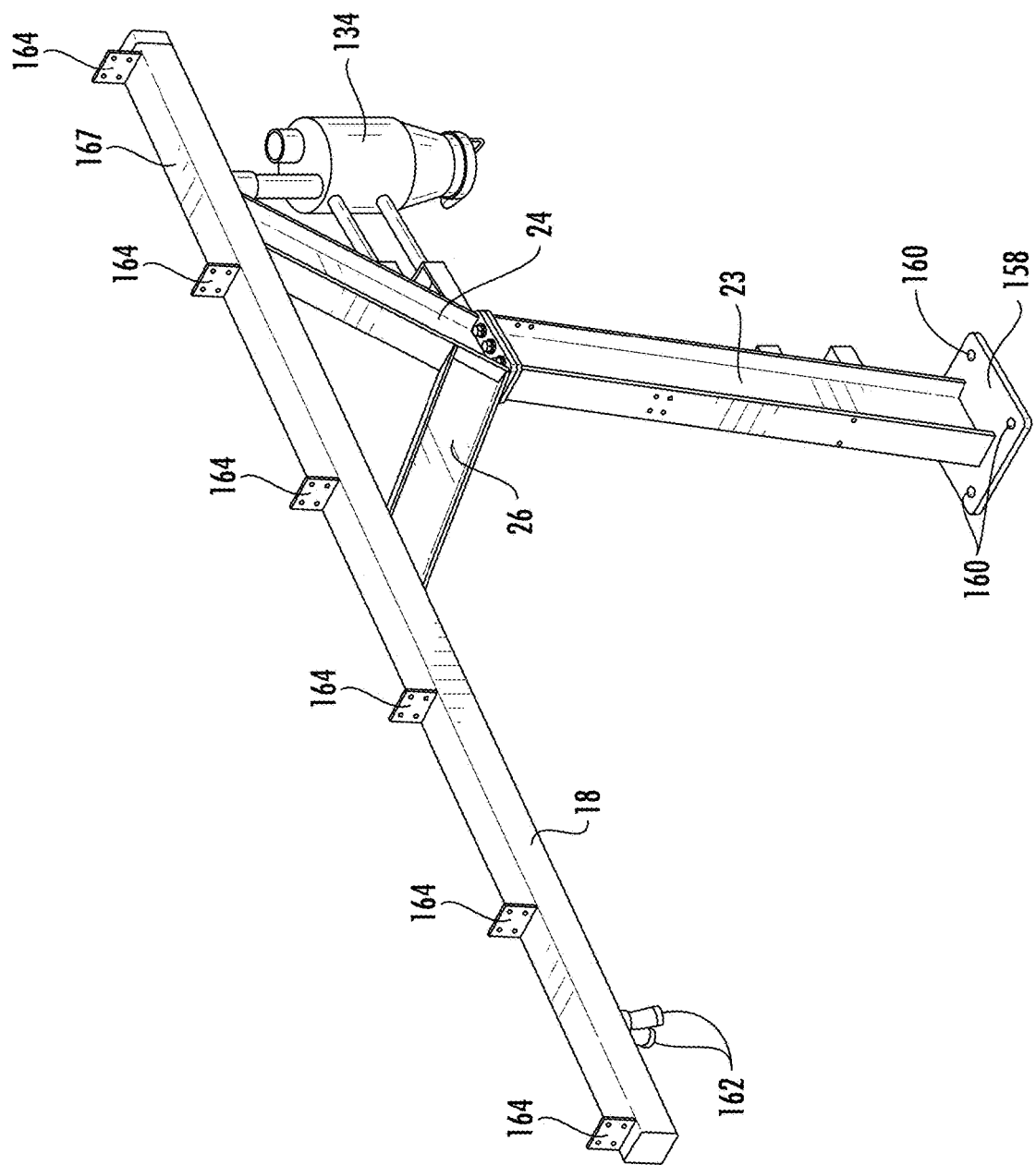
FIG. 17 is a perspective view of a single supporting structure of the vehicle stall and canopy system shown in FIG. 11 with the canopy now shown.

As shown in FIGS. 16-17, the configuration may include a plurality of upwardly extending mounting plates 164 that are welded or otherwise attached to the top surface 167 of the beam 18. These mounting plates 164 engage various solar panel mounting brackets. On one end, the mounting bracket may be a generally S-shaped bracket 166. The middle brackets are typically generally J-shaped brackets 170 so that the top of the J-shaped bracket may engaged two different solar panels and affix them in position. At the other end, while a generally S-shaped bracket may be used, a generally C-shaped bracket 168 is typically used to create a more aesthetically appealing look when the system is viewed by a user while entering. The generally C-shaped brackets could be replaced with the generally S-shaped brackets and vice versa if needed. Additionally, two generally C-shaped brackets could conceivably be used in the center portion of the mountings in place of the substantially J-shaped brackets 170, but this would not typically be done.

It is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, 10) contained within the range. In this specification and the appended claims, the singular forms "a," "an" and "the" include plural reference unless the context clearly dictates otherwise. All combinations of method steps or process steps as used herein can be performed in any order, unless otherwise specified or clearly implied to the contrary by the context in which the referenced combination is made.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the Applicant intends to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto."

What is claimed is:

1. A vacuum stall canopy system for covering and defining a vehicle wash bay comprising:
 a plurality of canopy supports each defining a side of a vehicle wash bay and wherein the plurality of canopy supports comprise a first canopy support and a second canopy support and wherein the first canopy support comprises:
  a first canopy post assembly having a first canopy base leg attached to a mounting surface; and
  a first canopy support beam attached to the top of the first canopy post assembly at first canopy support engagement location and extending forward and backward from the first canopy support engagement location and wherein the first canopy support base leg engages the mounting surface at a first predefined angle; and
 wherein the second canopy support comprises:

a second canopy post assembly having a second canopy base leg attached to the mounting surface; and a second canopy support beam attached to the top of the first canopy post assembly at first canopy support engagement location and extending forward and backward from the first canopy support engagement location and wherein the second canopy support base leg engages the mounting surface at a second predefined angle;

a roof panel coupled to a portion of the first canopy support beam and configured to span between the first canopy support beam of the first canopy support and the second canopy support beam of the second canopy support;

a debris separator disposed on at least one of the plurality of canopy supports, the debris separator having a first side and a second side;

a main air line fluidly connected to the debris separator and configured to be connected to a source of vacuum suction;

a first hose on the first side of the debris separator, and having a first nozzle on a distal end of the first hose from the debris separator; and a second hose on the second side of the debris separator, and having a second nozzle on a distal end of the second hose from the debris separator; and wherein the first predefined angle and the second predefined angle are not 90 degrees.

2. The vacuum stall canopy system of claim 1, wherein the debris separator is fluidly connected via a main hose assembly to a vacuum supply source located remote from the vacuum stall canopy system and outside of the vehicle wash bay.

3. The vacuum stall canopy system of claim 1, wherein the first canopy support and the second canopy support further comprise a first pair of stabilizing legs disposed between a top of the first canopy support base leg and the first canopy support beam and a second pair of stabilizing legs disposed between a top of the second canopy support base leg and the second canopy support beam and wherein the vacuum stall canopy system further defines a vehicle stall.

4. The vacuum stall canopy system of claim 1, wherein the roof panel comprises at least one solar panel and the roof panel is planar.

5. The vacuum stall canopy system of claim 4, wherein the at least one solar panel is configured to be connected to a mains power supply of a vehicle wash facility and to supply power to one or a plurality of electrically activated components of the overall vehicle wash facility or to a mains power grid.

6. The vacuum stall canopy system of claim 1, wherein the roof panel comprises at least one solar panel and the roof panel has an arcuate cross section taken between the front of the roof panel and the back of the roof panel and wherein the first canopy support beam and the second canopy support beam are arcuate and engage the roof panel.

7. The vacuum stall canopy system of claim 5, wherein the roof panel comprises a first roof panel portion having a first roof panel top portion and a second roof panel portion having a second roof panel top portion and at least one of the first roof panel portion and the second roof panel portion are at least partially covered on the top surface of first roof panel portion or the second roof panel portion with solar power cells.

8. The vacuum stall canopy system of claim 1, wherein the roof panel comprises a fabric canopy stretched between the first canopy support and the second canopy support.

9. The vacuum stall canopy system of claim 8, wherein the fabric canopy is attached to the first canopy support beam through a first quick-release mechanism and the second canopy support beam through a second quick-release mechanism.

10. The vacuum stall canopy system of claim 9, wherein the first quick-release mechanism and the second quick-release mechanism oppose one another on opposite sides of the fabric canopy each comprise a strap attached to a bar disposed within a pocket of the fabric canopy.

11. The vacuum stall canopy system of claim 10, wherein the first quick-release mechanism and the second quick-release mechanism each comprise a strap permanently attached to the fabric canopy.

12. The vacuum stall canopy system of claim 1, further comprising at least one of the following: a garbage can attached to at least one of the first canopy post assembly and the second canopy post assembly and suspended above the mounting surface and wherein the mounting surface is the ground, a mat rack attached to the at least one of the first canopy post assembly and the second canopy post assembly and suspended above the mounting surface, and an air hose bracket attached to at least one of the first canopy post assembly and the second canopy post assembly and wherein the roof panel is at least substantially parallel with the mounting surface and has a linear cross-section across substantially all of an entire width of the roof panel.

13. A structural arch system providing for a vehicle wash vacuum system comprising:

a first arch assembly comprising:

a first post assembly having a first base leg secured to the ground;

a first beam attached to a top portion of the first post assembly;

a second arch assembly comprising:

a second post assembly having a second base leg secured to the ground;

a second beam attached to a top portion of the second post assembly;

a roof assembly spanning between the first beam and the second beam on an upper portion of each of the first beam and the second beam;

a debris separator disposed on at least one of the first beam and the second beam, the debris separator having a first side and a second side;

a main air line fluidly connected to the debris separator and configured to be connected to a source of vacuum suction;

a first hose on the first side of the debris separator, and having a first nozzle on a distal end of the first hose from the debris separator; and a second hose on the second side of the debris separator, and having a second nozzle on a distal end of the second hose from the debris separator.

14. The structural arch system of claim 13, wherein the roof assembly comprises at least one solar panel.

15. The structural arch system of claim 14, wherein the roof assembly comprises a plurality of solar panels that overlap one another wherein each of the at least one solar panel has a plurality of solar cells.

16. The structural arch system of claim 13, wherein the roof assembly comprises a fabric canopy and wherein the fabric canopy is attached to the first beam using a first quick-release mechanism, the fabric canopy is attached to the second beam using a second quick-release mechanism and the first quick-release mechanism and the second quick-release mechanism each comprise a strap attached to a bar disposed within a pocket of the fabric canopy.

17. A structural arch system providing for a vehicle wash vacuum system comprising:
   a first arch assembly comprising:
   a first post attached to the ground;
   a first beam attached to the first post;
   a second arch assembly comprising:
   a second post attached to the ground;
   a second beam attached to the second post;
   a roof panel spanning between the first beam and the second beam on an upper portion of each of the first beam and the second beam;
   a debris separator disposed on the first beam;
   a main air line fluidly connected to the debris separator and configured to be connected to a source of vacuum suction; and
   a hose coupled to the debris separator and having a nozzle on a distal end of the hose from the debris separator.

18. The structural arch system of claim 17, wherein the first post comprises a base leg, and the first post further comprises a pair of stabilizing legs disposed between the base leg and the first beam.

19. The structural arch system of claim 17, wherein the debris separator comprises a first side and a second side, and wherein the hose is coupled to the debris separator on the first side.

20. The structural arch system of claim 19, further comprising a second hose coupled to the second side of the debris separator, and having a second nozzle on a distal end of the second hose from the debris separator and wherein the structural arch system further comprises:
   a second debris separator disposed on the second beam;
   the main air line fluidly connected to the second debris separator; and
   a third hose coupled to the second debris separator and having a third nozzle on a distal end of the third hose from the second debris separator.

\* \* \* \* \*